(12) United States Patent
Foti et al.

(10) Patent No.: US 10,203,053 B2
(45) Date of Patent: Feb. 12, 2019

(54) FLUID PERMEABLE HOSE CARCASS

(71) Applicant: Hose Master, LLC, Cleveland, OH (US)

(72) Inventors: Sam J. Foti, Lyndhurst, OH (US); Santo Foti, Orange Village, OH (US)

(73) Assignee: Hose Master LLC, Cleveland, OH (US)

( * ) Notice: Subject to any disclaimer, the term of this patent is extended or adjusted under 35 U.S.C. 154(b) by 306 days.

(21) Appl. No.: 14/867,477

(22) Filed: Sep. 28, 2015

(65) Prior Publication Data

US 2016/0097472 A1    Apr. 7, 2016

Related U.S. Application Data

(60) Provisional application No. 62/059,531, filed on Oct. 3, 2014.

(51) Int. Cl.
| | |
|---|---|
| *F16L 11/16* | (2006.01) |
| *F16L 11/08* | (2006.01) |
| *F16L 11/15* | (2006.01) |

(52) U.S. Cl.
CPC ............ *F16L 11/16* (2013.01); *F16L 11/083* (2013.01); *F16L 11/15* (2013.01)

(58) Field of Classification Search
CPC ........... F16L 11/16; F16L 11/15; F16L 11/083
USPC ................................ 138/134, 131, 138, 135
See application file for complete search history.

(56) References Cited

U.S. PATENT DOCUMENTS

| | | | |
|---|---|---|---|
| 3,682,203 A | 8/1972 | Foto et al. | |
| 6,446,672 B1 * | 9/2002 | Kalman | B29D 23/001 138/104 |
| 6,508,277 B1 * | 1/2003 | Imes | F01N 13/1816 138/109 |
| 6,543,488 B2 * | 4/2003 | Foti | F16L 11/16 138/129 |

(Continued)

FOREIGN PATENT DOCUMENTS

| | | | |
|---|---|---|---|
| WO | WO9961765 A1 | 12/1999 | |
| WO | WO 2004005785 A1 * | 1/2004 | ............ F16L 11/083 |

(Continued)

OTHER PUBLICATIONS

European Search Report dated Feb. 16, 2016 (6 pages).
European Examination Report for related European patent application No. 15275207.7 dated Mar. 21, 2018.

*Primary Examiner* — Craig Schneider
*Assistant Examiner* — David Deal
(74) *Attorney, Agent, or Firm* — John A. Yirga, Esq.; Tarolli, Sundheim, Covell & Tummino LLP (57) ABSTRACT

A flexible hose assembly includes a flexible fluid permeable annular carcass arrangement having an inner and an outer diameter formed about a central axis. The carcass arrangement provides skeletal strength to the hose assembly against radial forces. The carcass arrangement has a plurality of interconnecting strips forming convoluted joints between the strips. The convoluted joints have an inner lip and an outer lip at opposite ends of the strips; and the carcass further comprises a plurality of channels formed along an entire length of first and second sides of the strips, the channels creating at least one fluid passage in each of the convoluted joint forming the carcass for the passage of fluids between the inner and outer diameters.

12 Claims, 5 Drawing Sheets

(56) References Cited

U.S. PATENT DOCUMENTS

| | | | | |
|---|---|---|---|---|
| 8,256,469 B2* | 9/2012 | Felix-Henry | ......... | F16L 11/083 138/104 |
| 8,714,204 B2* | 5/2014 | Bryant | ................ | B29D 23/001 138/130 |
| 2002/0195157 A1* | 12/2002 | Foti | ........................ | F16L 11/16 138/135 |
| 2011/0162750 A1 | 7/2011 | Marchand | | |

FOREIGN PATENT DOCUMENTS

| | | |
|---|---|---|
| WO | WO2004005785 A1 | 1/2004 |
| WO | WO2014023515 A1 | 2/2014 |

* cited by examiner

FLUID PERMEABLE HOSE CARCASS

CROSS REFERENCES TO RELATED APPLICATIONS

The following application claims priority under 35 U.S.C. 119(e) to U.S. Provisional Patent Application Ser. No. 62/059,531 filed Oct. 3, 2014 entitled FLUID PERMEABLE HOSE CARCASS. The above-identified application is incorporated herein by reference in its entirety for all purposes.

TECHNICAL FIELD

The present disclosure relates to a fluid permeable hose carcass, and more particularly, a flexible fluid permeable hose carcass that provides skeletal strength to a hose assembly while allowing for the passage of fluid to prevent failure during substantially instantaneous depressurization of the hose assembly.

BACKGROUND

Conventional hose assemblies provide pliable transport lines serving to provide deep-water conduits to deep-sea oil tankers. The conventional hose assemblies are several thousand meters long and can internally comprise several individual internal hoses such as electrical lines or fiber optics for controls or communications or for the passage of fluids.

Because of the deep-sea application, the hose assemblies are exposed to extremely high-pressure conditions that require an internal metallic carcass to prevent collapsing. Many of such assemblies are required to be constructed under Specification 17 for Unbonded Flexible Pipe set forth by the American Petroleum Institute ("API"). An example of such a hose assembly is a product sold by MFX do Brasil of Salvador, Brazil under part number 1¼" HCR20KPSI. The specification of the MFX do Brasil part number 1¼" HCR10KPSI hose assembly and API Specification 17 for Unbonded Flexible Pipe are both incorporated herein by reference.

Further discussion relating to the construction and application of conventional hose assemblies is discussed in U.S. Patent Publication No. 2011/0162750 to Marchand entitled FLEXIBLE PIPE FOR CONVEYING HYDROCARBONS HAVING A HIGH CORROSION RESISTANCE, AND METHOD OF MAKING SAME that was published on Jul. 7, 2011. The above-identified U.S. patent publication is incorporated herein by reference in its entirety.

SUMMARY

One example embodiment of the present disclosure includes a flexible hose assembly that includes a flexible fluid permeable annular carcass arrangement having an inner and an outer diameter formed about a central axis. The carcass arrangement provides skeletal strength to the hose assembly against radial forces. The carcass arrangement has a plurality of convolutions formed by a metal strip and fastened at convoluted joints between the convolutions. The convoluted joints have an inner lip and an outer lip at opposite ends of the convolutions. The carcass further includes a plurality of channels formed along an entire length of first and second sides of the strip, the channels creating at least one fluid passage in each of the convoluted joint forming the carcass for the passage of fluids between the inner and outer diameters.

Another example embodiment of the present disclosure includes a flexible hose assembly comprising a flexible fluid permeable annular carcass arrangement having an inner and an outer diameter formed about a central axis. The carcass arrangement provides skeletal strength to the hose assembly against radial forces. The carcass arrangement comprises a plurality of convolutions formed by a metal strip and fastened at convoluted joints between the convolutions. The convoluted joints have an inner lip and an outer lip at opposite ends of the convolutions. The carcass further comprises a plurality of notches spaced along the opposite ends of the strip, the notches creating at least one fluid passage in each of the convoluted joints forming the carcass for the passage of fluids between the inner and outer diameters.

While yet another example embodiment of the present disclosure includes a method of manufacturing a hose assembly comprising the steps of: passing a single metal strip through a die; winding the strip on a mandrel to create a plurality of convolutions; fastening adjacent convolutions together at an interlocked joint to form a continuous carcass; surrounding the continuous carcass with a sealing sheath; surrounding the sealing sheath with at least one braided layer; and surrounding the at least one braided layer with an external sheath.

BRIEF DESCRIPTION OF THE DRAWINGS

The foregoing and other features and advantages of the present disclosure will become apparent to one skilled in the art to which the present invention relates upon consideration of the following description of the invention with reference to the accompanying drawings, wherein like reference numerals refer to like parts unless described otherwise throughout the drawings and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

The apparatus and method components have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

DETAILED DESCRIPTION

Referring now to the figures generally wherein like numbered features shown therein refer to like elements throughout unless otherwise noted. The present disclosure relates to a fluid permeable hose carcass, and more particularly, a flexible fluid permeable hose carcass that provides skeletal strength to a hose assembly while allowing for the passage of fluid to prevent failure during substantially instantaneous depressurization of the hose assembly.

Figure 1:
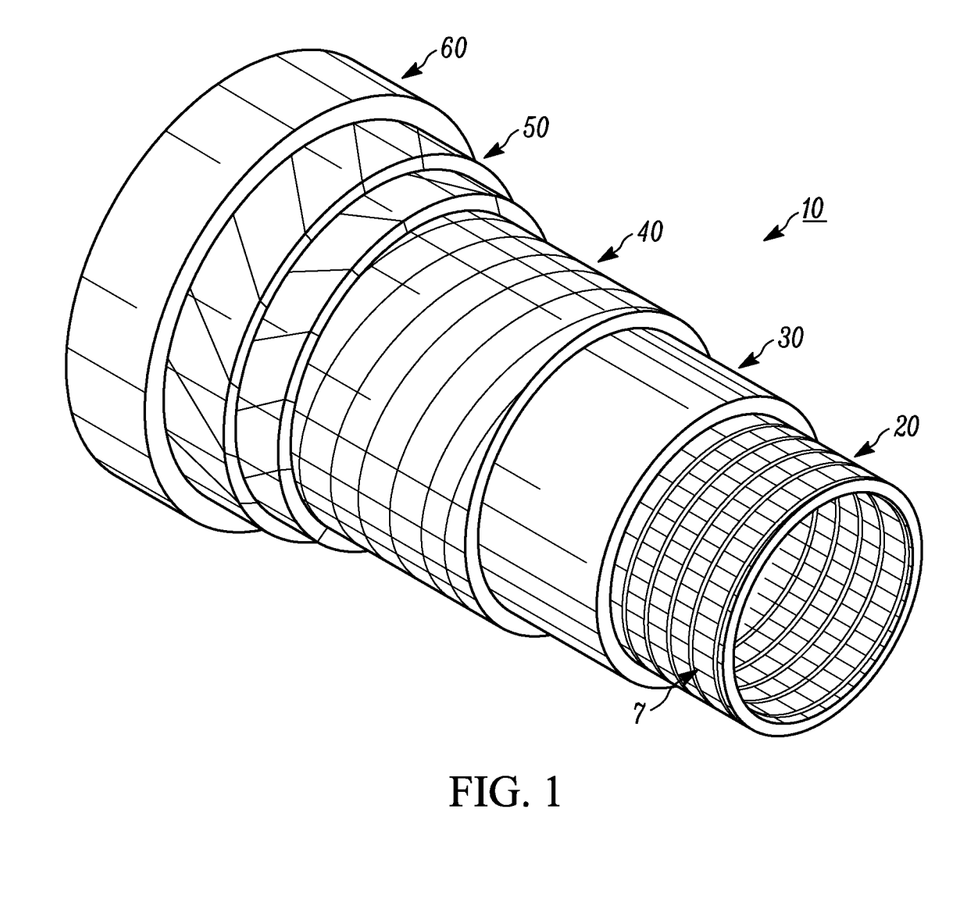
FIG. 1 is a flexible tubular hose assembly constructed in accordance with one example embodiment of the present disclosure.

FIG. 1 is a flexible tubular hose assembly 10 constructed in accordance with one example embodiment of the present disclosure. The flexible tubular hose assembly 10 is intended in one example embodiment for offshore oil production, and more particularly for the transporting of fluids, such as oil. In an alternative example embodiment, the hose assembly 10 acts as a conduit for electrical cables and/or the transport of fluids.

The hose assembly 10 comprises from the inside radially outward, an internal fluid permeable hose carcass arrangement 20, a polymeric or nylon sealing sheath 30, one or more braided layers 40 and 50, and a polymeric external sheath 60. The polymeric sealing sheath 30 has the role of confining the fluid flowing inside the hose assembly 10.

In conventional hose assemblies substantially instantaneous depressurization (evacuation to equilibrium in less than one second) caused by an explosion, rupture, or release of a plug or end cap causing the evacuation of the carcass and/or surrounding sealing sheath to a lower pressure has resulted in localized collapsing of the carcass. The carcass in conventional hose assemblies primary role was only to endure radial forces from deep-sea fluid pressure that would otherwise collapse the hose. This new form of failure from instantaneous depressurization has created a need for a new carcass design.

The flexible tubular hose assembly 10 is constructed to meet the standards required under API Specification 17 for unbounded flexible pipe. Moreover, the fluid permeable hose carcass 20 is advantageously designed for the passage of fluent material or fluids to prevent failure during substantially instantaneous depressurization of the hose assembly 10.

Figure 2:
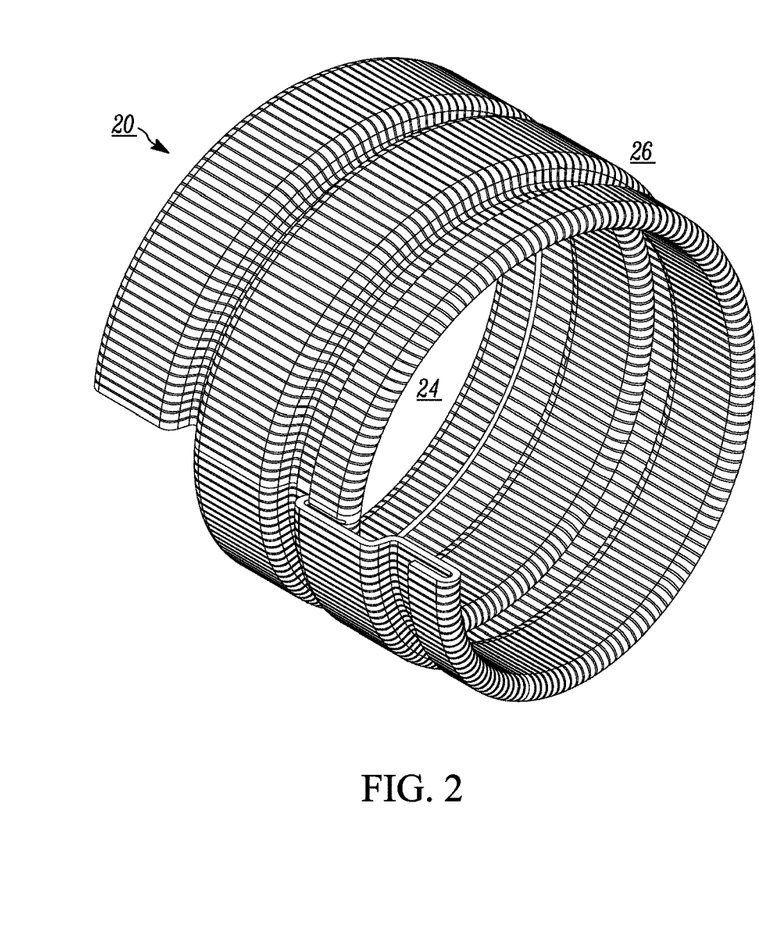
FIG. 2 is a partial perspective view of a carcass arrangement constructed in accordance with one example embodiment of the present disclosure.

FIG. 2 is a partial perspective view of a flexible fluid permeable hose carcass arrangement 20 constructed in accordance with one example embodiment of the present disclosure. The carcass arrangement 20 is a formed metal strip, or ribbon, 22 that is helically wound with the edges of adjacent convolutions interlocked in such a way that the hose is flexible yet permeable for the passage of fluent material or fluids between an internal cavity or inner diameter 24 to a region 26 outside the carcass and within the sealing sheath 30.

Typically, a majority of fluid or fluent material passes axially (along axis x) of the carcass 20 shared with the central, axis of the hose 10 to create a flow of fluent material axially through the hose 10. While the hose 10 may be used to transport any suitable fluent material, it is specially adapted to convey particulate material from place to place.

In the illustrated example embodiment, the carcass arrangement 20 is made from stainless steel. However, other metals of similar strength and properties are intended to be within the spirit and scope of the present disclosure.

The carcass arrangement 20 is formed by passing the flat thin metal strip 22 through forming dies and helically winding the strip on a mandrel with adjacent convolutions being fastened together at an interlocked joint 32 to form a continuous carcass of adjoining convolutions. Further details concerning the specific apparatus directed toward the methods of assembly of the flexible metal hose are disclosed in U.S. Pat. No. 3,682,203 to Foti et al., which is incorporated herein by reference in its entirety. The carcass arrangement 20 like the hose 10 may be of any suitable diameter or length. It should be apparent to those skilled in the art that a variety of carcass 20 and hose 10 sizes may be manufactured.

Figure 3:
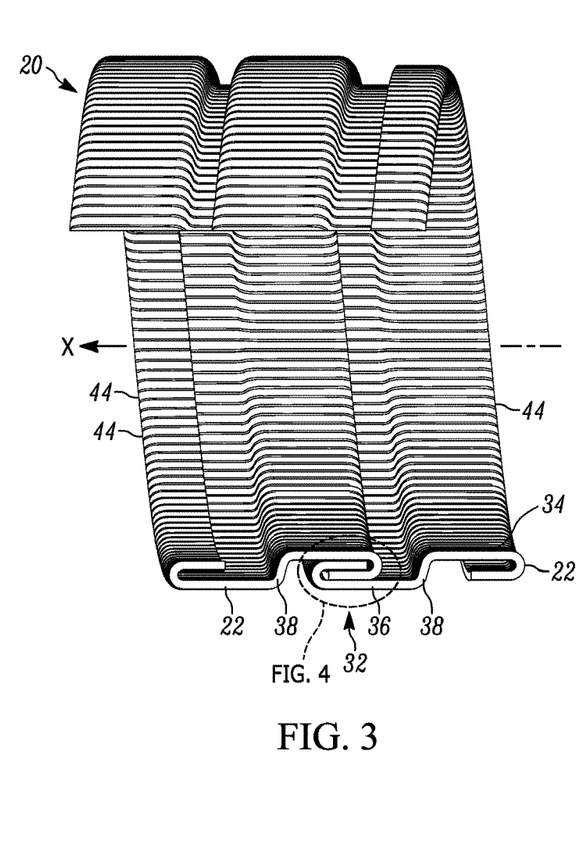
FIG. 3 is a partial section view of FIG. 2.
Figure 4:
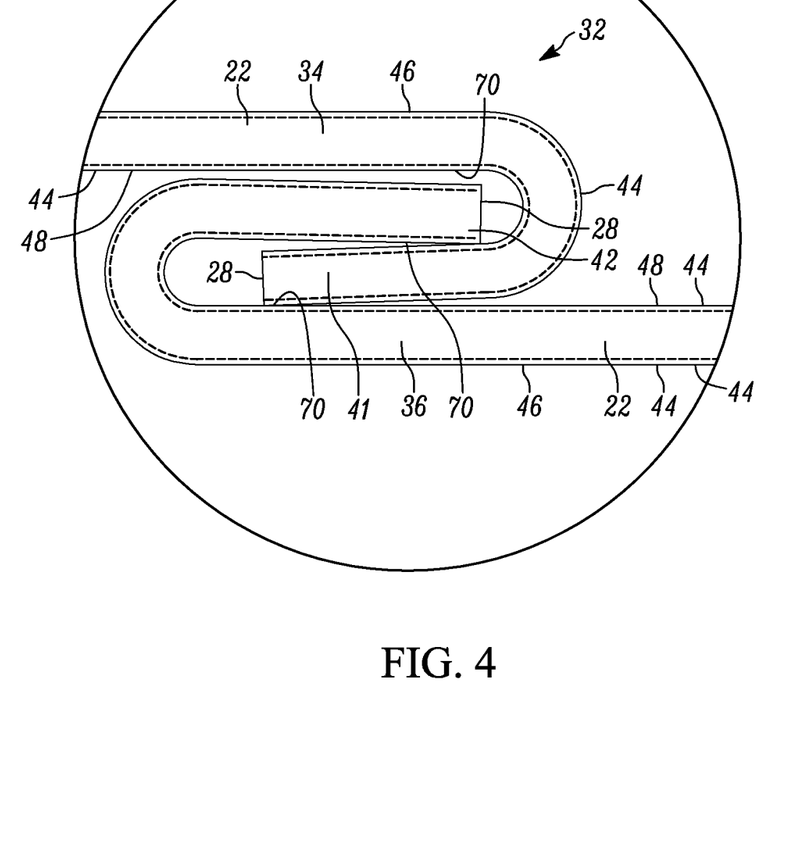
FIG. 4 is a magnified view of a portion of the carcass arrangement of FIG. 3.

The strip 22 is passed through a die and wound on the mandrel to form a generally "S-shaped" ribbon (as seen in FIG. 3) having radially inner and outer body portions 34, 36, respectively that are axially spaced apart and joined by a radially extending transition wall 38, and further including reversely curved radially inner and outer lips 41, 42, respectively that extend from respective body portions to form opposite strip edges. As the strip 22 passes onto the mandrel, the radially inner lip 41 interfits with the radially outer lip 42 of the adjoining convolution, as shown by FIGS. 3 and 4. The strip 22 continues to be wound on the mandrel in this fashion to produce a continuous carcass arrangement 20 made from interlocked helical adjoining convolutions or joint 32 of a single metal strip.

Adjoining convolutions are so constructed and arranged that the carcass arrangement 20 and hose 10 may be flexed and subjected to twisting forces without unwinding the convolutions. In the illustrated example embodiment of FIGS. 2-4, forming dies emboss a plurality of channels 44 for the passage of fluid or fluent material from between inner and outer regions 24, 26, respectively. The channels 44 are grooves that extend on both a first 46 and second 48 sides of the entire length of the strip 22.

The channels 44 positioning on both sides of the strip 22 advantageously allow for the permeability of the carcass arrangement 20 between inner and outer regions 24, 26. Moreover, the plurality of channels 44 create multiple fluid or fluent material passages 70 in the interlocked joint 32. Thus, the channels 44 allow for the flexible fluid permeable hose carcass 20 to facilitate the passage of fluid to prevent failure during substantially instantaneous depressurization of the hose assembly 10.

In the illustrated example embodiment, the channels 44 are approximately one-ten thousandth (0.0001") of one inch deep or deep enough to allow easy passage of the fluid on both sides 46, 48 of the metal strip 22 and transverse to the ends 28 of the strip 22. In another example embodiment, the channels 44 are perpendicular to the ends 28 of the strip and substantially parallel with the central axis x of the carcass arrangement 20 and hose assembly 10, the channels extending about the entire length and on both sides 28 of the strip. Thus advantageously, fluid passages are formed by the channels 44 as well as between the sealing sheath 30 and outer portion 26 of the carcass 20.

In multiple tests of the carcass arrangement 20 of FIGS. 2-4, the internal fluid pressure was elevated in excess of seventeen thousand (17,000) psi before exposed to a substantially instantaneous depressurization (less than one-second) of the carcass 20 and hose assembly 10. In each test, no damage occurred to the carcass arrangement 20 or hose assembly 10. After undergoing the above test, the tested carcass arrangement 20 underwent standardized carcass testing, such as an external force crush test and exceeded six-thousand (6,000) psi before experiencing any localized damage.

Figure 5:
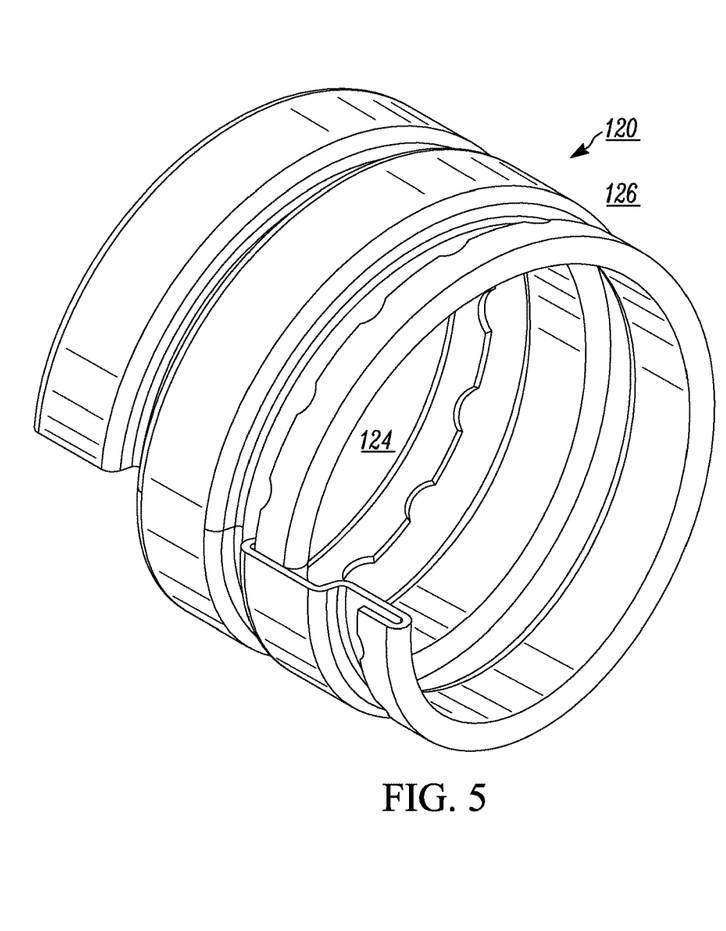
FIG. 5 is a partial perspective view of a carcass arrangement constructed in accordance with another example embodiment of the present disclosure.

FIG. 5 is a partial perspective view of a flexible fluid permeable hose carcass arrangement 120 constructed in accordance with another example embodiment of the present disclosure. The carcass arrangement 120 is a formed metal strip, or ribbon, 122 that is helically wound with the edges of adjacent convolutions interlocked in such a way that the hose is flexible yet permeable for the passage of fluent material or fluids between an internal cavity or inner diameter 124 to a region 126 outside the carcass and within the sealing sheath 30.

Typically, a majority of fluid or fluent material passes axially (along axis x) of the carcass 120 shared with the central axis of the hose 10 to create a flow of fluent material axially through the hose. While the hose 10 may be used to transport any suitable fluent material, it is specially adapted to convey particulate material from place to place.

In the illustrated example embodiment, the carcass arrangement 120 is made from stainless steel. However, other metals of similar strength and properties are intended to be within the spirit and scope of the present disclosure.

The carcass arrangement 120 is formed by passing the flat thin metal strip 122 through forming dies and helically winding the strip on a mandrel with adjacent convolutions being fastened together at an interlocked joint 132 to form a continuous carcass of adjoining convolutions. Further details concerning the specific apparatus directed toward the methods of assembly of the flexible metal hose are disclosed in U.S. Pat. No. 3,682,203 to Foti et al., which is incorporated herein by reference in its entirety. The carcass arrangement 120 like the hose 10 may be of any suitable diameter or length. It should be apparent to those skilled in the art that a variety of carcass 120 and hose 10 sizes may be manufactured.

Figure 6:
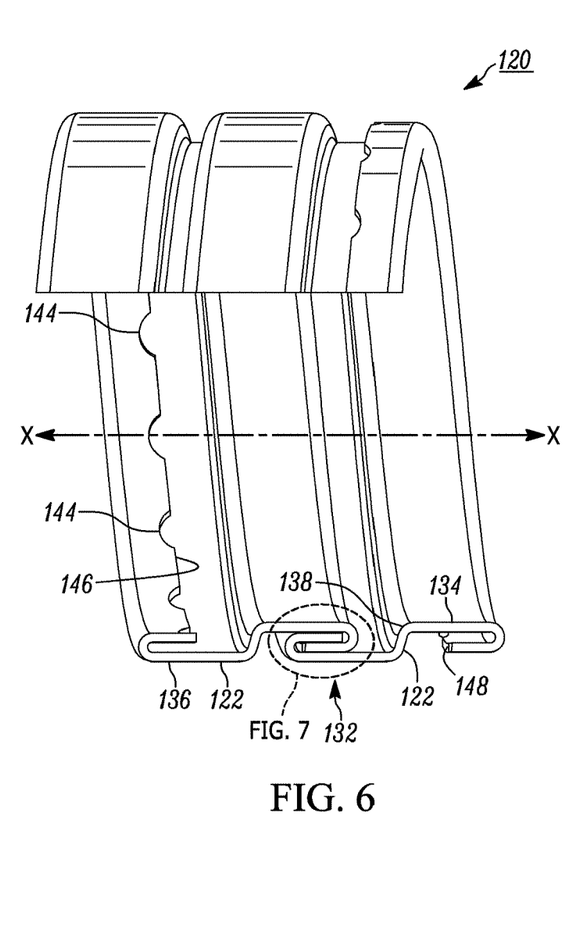
FIG. 6 is a partial section view of FIG. 5.
Figure 7:
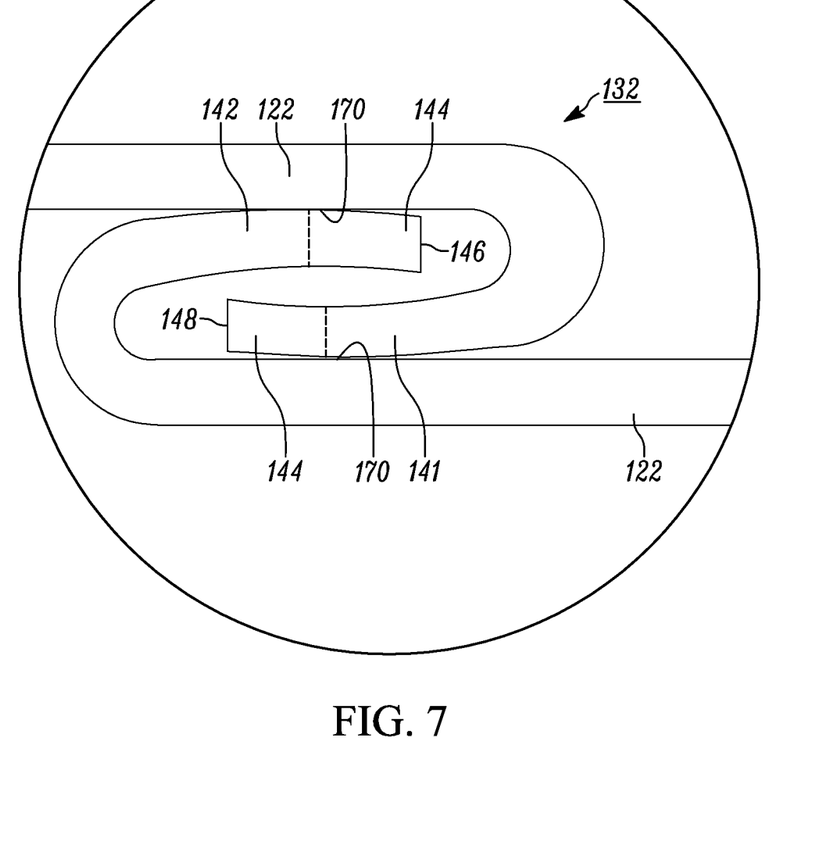
FIG. 7 is a magnified view of a portion of the carcass arrangement of FIG. 6.

The strip 122 is passed through a die and wound on the mandrel to form a generally "S-shaped" ribbon (as seen in FIG. 7) having radially inner and outer body portions 134, 36, respectively that are axially spaced apart and joined by a radially extending transition wall 138, and further including reversely curved radially inner and outer lips 141, 142, respectively that extend from respective body portions to form opposite strip edges. As the strip 122 passes onto the mandrel, the radially inner lip 141 interfits with the radially outer lip 142 of the adjoining convolution, as shown by FIGS. 6 and 7. The strip 122 continues to be wound on the mandrel in this fashion to produce a continuous carcass arrangement 120 made from interlocked helical adjoining convolutions or joint 132 of a single metal strip.

Adjoining convolutions are so constructed and arranged that the carcass arrangement 120 and hose 10 may be flexed and subjected to twisting forces without unwinding the convolutions. In the illustrated example embodiment of FIGS. 5-7, punching dies form a plurality of spaced arcuate notches 144 for the passage of fluid or fluent material from between inner and outer regions 124, 126, respectively. The notches 144 are arcuate passages that are spaced and through both first 146 and second 148 ends of the entire length of the ends of the strip 122.

The arcuate notches 144 positioning on both ends 146 and 148 of the strip 122 advantageously allow for the permeability of the carcass arrangement 120 between inner and outer regions 124, 126. Moreover, the plurality of notches 144 create multiple fluid or fluent material passages 170 in the interlocking convolution 132. Thus, the arcuate notches 144 allow for the flexible fluid permeable hose carcass 120 to facilitate the passage of fluid to prevent failure during substantially instantaneous depressurization of the hose assembly 10.

While arcuate notches 144 are shown, it should be appreciated that other aperture fluid-passage geometries are contemplated to be within the spirit and scope of the present disclosure. For example, elliptical or rectangular passages are suitable geometrical forms of notches 144.

In the foregoing specification, specific embodiments have been described. However, one of ordinary skill in the art appreciates that various modifications and changes can be made without departing from the scope of the disclosure as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The disclosure is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a nonexclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art. In one non-limiting embodiment the terms are defined to be within for example 10%, in another possible embodiment within 5%, in another possible embodiment within 1%, and in another possible embodiment within 0.5%. The term "coupled" as used herein is defined as connected or in contact either temporarily or permanently, although not necessarily directly and not necessarily mechanically. A device or structure that is "configured" in a certain way is configured in at least that way, but may also be configured in ways that are not listed.

To the extent that the materials for any of the foregoing embodiments or components thereof are not specified, it is to be appreciated that suitable materials would be known by one of ordinary skill in the art for the intended purposes.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A flexible hose assembly comprising:
a flexible fluid permeable annular carcass arrangement having an inner and an outer diameter formed about a central axis, the carcass arrangement providing skeletal strength to said hose assembly against radial forces, the carcass arrangement comprising a plurality of convolutions formed by an uninterrupted metal strip and fastened at convoluted joints between said convolutions, said convoluted joints having an inner lip and an outer lip at first and second ends of said convolutions; and
the carcass further comprising a plurality of channels defined by a plurality of adjacent ridges and valleys on first and second sides of said strip, said adjacent ridges and valleys extend on the first and second sides of said strip continuously from the first end to the second end of said convolutions, said channels creating at least one fluid passage in each of said convoluted joints forming said carcass for the passage of fluids between said inner and outer diameters, wherein the at least one fluid passage comprises a plurality of channels formed along an entire length of first and second sides of said strip.

2. The flexible hose assembly of claim 1 wherein said channels are transverse to first and second ends of said strip.

3. The flexible hose assembly of claim 1, wherein said convolutions are substantially S-shaped and have an inner body portion and an outer body portion, said inner and outer lips extending from said inner and outer body portions, respectively.

4. The flexible hose assembly of claim 3, wherein said inner body portion and said outer body portion are joined by a transition all extending radially relative to said central axis.

5. The flexible hose assembly of claim 1, wherein said inner lip interfits with said outer lip of adjoining convolutions to fasten said adjoining convolutions together.

6. The flexible hose assembly of claim 1, further comprising a sealing sheath, at least one braided layer, and an external sheath, said sealing sheath confining fluids inside the hose assembly.

7. The flexible hose assembly of claim 1, wherein said channels are substantially perpendicular to first and second ends of said strip and substantially parallel with said central axis of the flexible hose assembly.

8. A flexible hose assembly comprising:
a flexible fluid permeable annular carcass arrangement having an inner and an outer diameter formed about a central axis, the carcass arrangement providing skeletal strength to said hose assembly against radial forces, the carcass arrangement comprising a plurality of convolutions formed by an uninterrupted metal strip and fastened at convoluted joints between said convolutions, said convoluted joints having an inner lip and an outer lip at first and second ends of said convolutions wherein said inner lip interfits with said outer lip of adjoining convolutions to fasten said adjoining convolutions together; and
the carcass further comprising a plurality of channels defined by a plurality of adjacent ridges and valleys on first and second sides of said strip, said adjacent ridges and valleys extend on the first and second sides of said strip continuously from the first end to the second end of said convolutions, said channels creating at least one fluid passage in each of said convoluted joints forming said carcass for the passage of fluids between said inner and outer diameters, wherein the at least one fluid passage comprises a plurality of channels formed along an entire length of first and second sides of said strip wherein said channels are substantially perpendicular to first and second ends of said strip and substantially parallel with said central axis of the flexible hose assembly.

9. The flexible hose assembly of claim 8, wherein said inner lip interfits with said outer lip of adjoining convolutions to fasten said adjoining convolutions together, and wherein the interfit aligns channels formed on said inner lip and said outer lip.

10. The flexible hose assembly of claim 8, wherein said convolutions are substantially S-shaped and have an inner body portion comprising the channels and an outer body portion comprising the channels, said inner and outer lips comprising the channels extending from said inner and outer body portions, respectively.

11. The flexible hose assembly of claim 10, wherein said inner body portion and said outer body portion are joined by a transition wall extending radially relative to said central axis.

12. The flexible hose assembly of claim 8, further comprising a sealing sheath, at least one braided layer, and an external sheath, said sealing sheath confining fluids inside the hose assembly.

* * * * *